United States Patent [19]

Sakashita et al.

[11] Patent Number: 5,578,883
[45] Date of Patent: Nov. 26, 1996

[54] MOTOR HAVING A FIXING STRUCTURE FOR FIXING A BEARING SET TO A CIRCUIT BOARD

[75] Inventors: Hiroshi Sakashita; Yukio Kotagiri, both of Nagano, Japan

[73] Assignee: Kabushiki Kaisha Sankyo Seiki Seisakusho, Nagano, Japan

[21] Appl. No.: 267,240

[22] Filed: Jun. 29, 1994

[30] Foreign Application Priority Data

Jun. 29, 1993 [JP] Japan .................................. 5-182253

[51] Int. Cl.⁶ .............................. H02K 1/18; H02K 5/00
[52] U.S. Cl. ........................ 310/91; 310/217; 310/DIG. 6
[58] Field of Search .................................. 310/71, 90, 91, 310/DIG. 6, 217; 360/98.07, 99.04, 99.08

[56] References Cited

U.S. PATENT DOCUMENTS 5,027,026  6/1991  Mineta et al. .......................... 310/91
5,173,628  12/1992  Yoshida et al. ........................ 310/71
5,461,271  10/1995  Asama et al. .......................... 310/91

FOREIGN PATENT DOCUMENTS 2-13256  1/1990  Japan ...................................... 310/91

*Primary Examiner*—Clayton E. LaBalle
*Attorney, Agent, or Firm*—Sughrue, Mion, Zinn, Macpeak & Seas

[57] ABSTRACT

A motor in which flange portions are partially formed on the outer peripheral surface of a housing. Flange portions, which can be respectively superimposed on the flange portions of the housing, are formed on the inner peripheral surface of a stator core. Projected portions and screw holes are formed in the stator core such that they are positioned adjacent to each other. Then, while the flange portions of the stator core are respectively superimposed on the flange portions of the housing, screws are respectively inserted through the screw holes in the flange portions in contact with the projected portions into screw holes formed in a circuit board, whereby the flange portions of the stator core are flexed to press down the flange portions of the housing, so that the housing can be fixed to the circuit board.

6 Claims, 4 Drawing Sheets

5,578,883

MOTOR HAVING A FIXING STRUCTURE FOR FIXING A BEARING SET TO A CIRCUIT BOARD

BACKGROUND OF THE INVENTION

1. Field of the Invention

The present invention relates to a motor in which a bearing set is composed of a bearing and a housing for holding the bearing, or a bearing set is composed simply of a bearing and, in particular, to an improved fixing structure for fixing such a bearing set to a circuit board.

2. Description of the Related Art

For example, as a brushless motor which is used for a disk drive, there is known a structure which is shown in FIG. 12. A circuit board 31 includes a plurality of parts (not shown) mounted therein so as to make a desired circuit. The circuit board 31 includes a through-hole 41 formed in the central portion thereof and a screw hole 32 formed in the radial direction thereof. In the through-hole 41, there is mounted a cylindrical housing 35 which holds a bearing 34 with the inner peripheral surface thereof and includes a flange portion 36 formed on the outer peripheral surface thereof. Also, a rotary shaft 37 to be rotatably supported by the bearing 34 is inserted into the through-hole 41. In the flange portion 36 of the housing 35, there is formed a screw hole 42 such that it coincides with the screw hole 32, and the lower surface of the flange portion 36 is in contact with the upper surface of the circuit board 31. As the material of the housing 35, generally, there is used a relatively soft material such as a zinc die casting, an aluminum die casting, a resin molding or the like. Here, the lower surface of the flange portion 36 of the housing 35 is race-worked in order to enhance the mounting accuracy of the housing 35 when it is fixed to the circuit board 31, which will be described later in detail.

A stator core 39 including a screw hole 43 is in contact with the upper surface of the flange portion 36 of the housing 35 in such a manner that the screw hole 43 coincides with the screw hole 42 formed in the flange portion 36. If a screw 44 is so inserted into the screw hole 43 as to extend through the screw hole 43 and thus the screw 44 is screwed into the screw hole 32 in the circuit board 31, then the flange portion 36 of the housing 35 is pressed by the screw 44 so that the housing 35 can be fixed to the circuit board 31. The stator core 39 is formed of a plurality of core materials superimposed on top of one another, and includes a plurality of salient poles around which a stator coil 40 is wound. Here, the bearing 34 and housing 35 form a bearing set 33, the stator core 39 with the stator coil 40 wound therearound forms a core winding set 38, and a stator set 45 can be formed by the bearing set 33 when it is mounted to the circuit board 31 by the core winding set 38.

A cup-shaped rotor case 46 is disposed on the upper portion of the stator set 45. A drive magnet 47 is fixed to the inner peripheral surface of the rotor case 46 in such a manner that the drive magnet 47 is opposed to the salient poles of the stator core 39. In addition, the rotor case 46 includes on the upper surface thereof a hub base 48 on which a disk can be placed. Also, the rotary shaft 37, which is to be inserted into the through-hole 41 in the circuit board 31, is fixed to the central portion of rotor case 46. The rotor case 46, which includes the drive magnet 47 and hub base 48, and the rotary shaft 37 cooperate in forming a rotor set 49. In the motor having the above-mentioned structure, if the stator coil 40 of the stator core 39 is energized electrically, then the energizing current and a magnetic field generated from the drive magnet 47 interact with each other, so that the rotor set 49 starts to rotate as an integral body.

However, in the above-mentioned conventional motor, there remains the following problems to be solved:

(1) Since the housing 35 of the bearing set 33 is formed of a soft material, when trying to make it thinner, the thickness of the flange portion 36 thereof is relatively smaller than the thickness of the stator core 39. On the other hand, when the stator core 39 is pressed by the screw 44, the pressing force of the screw 44 is concentrated onto one point to thereby deform the surface of the stator core 39. For these reasons, even if the mounting accuracy of the mounting surface of the flange portion 36 of the housing 35 with respect to the surface of the circuit board 31 is enhanced, when the flange portion 36 is inserted between the stator core 39 and the circuit board 31 and is screwed there, the material of the housing 35 is absorbed into the deformed surface of the stator core 39, so that the assembling accuracy of the housing 35 with respect to the circuit board 31 is worsened.

(b 2) It is necessary to race-work the mounting surface of the flange portion 36 of the housing 35 with respect to the circuit board 31 and it is also necessary to work the screw hole 42. This increases the number of working steps, which in turn increases the cost of the motor.

(3) Because the core winding set 38 is assembled to the circuit board 31 after the bearing set 33 is assembled, a reflow soldering method cannot be used, which results in the increased cost and in the unstabilized quality of the motor.

SUMMARY OF THE INVENTION

The present invention aims at eliminating these drawbacks found in the conventional motor. Accordingly, it is an object of the invention to provide a motor which is improved in the assembling accuracy of a housing with respect to a circuit board, reduces the cost thereof, and stabilizes the quality thereof.

In attaining the above object, according to one aspect of the invention, there is provided a motor including a stator core having a plurality of salient poles with a stator coil wound therearound, a rotor case having a drive magnet disposed opposed to the stator core, a bearing for supporting a rotary shaft fixed to the central portion of the rotor case, and a housing fixed to a circuit board for holding the bearing. The housing includes flange portions provided partially on the outer peripheral surface thereof, the stator core includes flange portions provided on the inner peripheral surface thereof such that they can be superimposed on the flange portions of the housing. The stator core further includes projected portions and screw holes respectively formed adjacent to the projected portions. Accordingly, while the flange portions of the stator core are respectively superimposed on the flange portions of the housing, screws are respectively inserted through the screw holes in contact with the projected portions and are thus threadedly engaged into the circuit board to thereby flex the flange portions of the stator core and thus press down the flange portions of the housing, so that the housing can be fixed to the circuit board.

According to another aspect of the invention, there is provided a motor including a stator core having a plurality of salient poles with a stator coil wound therearound, a rotor case having a drive magnet disposed opposed to the stator core, and a bearing for supporting a rotary shaft fixed to the central portion of the rotor case. The bearing includes flange portions provided partially on the outer peripheral surface thereof, the stator core includes flange portions provided on the inner peripheral surface thereof such that they can be superimposed on the flange portions of the bearing. The stator core further includes projected portions and screw holes respectively formed adjacent to the projected portions. Accordingly, while the flange portions of the stator core are superimposed respectively on the flange portions of the bearing, screws are respectively inserted through the screw holes in contact with the projected portions and are thus screwed into the circuit board to thereby flex the flange portions of the stator core and thus press down the flange portions of the bearing, so that the bearing can be fixed to the circuit board.

According to the structure of the one aspect of the invention, flange portions are partially provided on the outer peripheral surface of the housing, while flange portions respectively superimposable on the flange portions of the housing are partially provided on the inner peripheral surface of the stator core, and projected portions and screw holes are also formed in the stator core in such a manner that the projected portions and screw holes are positioned adjacent to each other. After this, the flange portions of the stator core are superimposed on the flange portions of the housing, respectively. In this state, screws are respectively inserted through the screw holes formed in the flange portions of the stator core in contact with the projected portions and are thus threadedly engaged into a circuit board. This flexes the flange portions of the stator core to press down the flange portions of the housing, so that the housing can be fixed to the circuit board.

According to the structure of the other aspect of the invention, flange portions are partially provided on the outer peripheral surface of the bearing, while flange portions respectively superimposable on the flange portions of the bearing are partially provided on the inner peripheral surface of the stator core, and projected portions and screw holes are also formed in the stator core in such a manner that the projected portions and screw holes are positioned adjacent to each other. After this, the flange portions of the stator core are superimposed on the flange portions of the bearing, respectively. In this state, screws are respectively inserted through the screw holes formed in the flange portions of the stator core in contact with the projected portions and are thus engaged threadedly into the circuit board. This flexes the flange portions of the stator core to press down the flange portions of the bearing, so that the bearing can be fixed to the circuit board.

BRIEF DESCRIPTION OF DRAWINGS

Other features and advantages of the present invention be apparent from the following description taken in connection with the accompanying drawings wherein.

DETAILED DESCRIPTION OF THE PREFERRED EMBODIMENTS

A description will now be given hereinbelow of the embodiments of a motor according to the invention with reference to the accompanying drawings.

Figure 1:
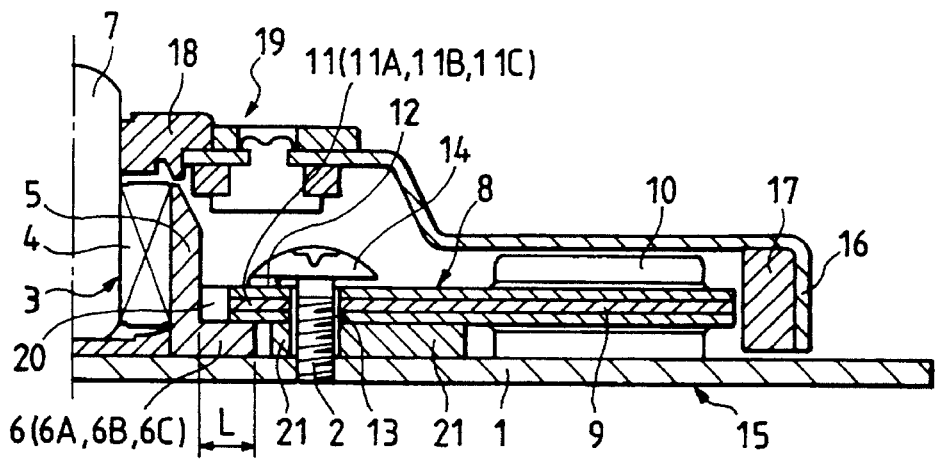
FIG. 1 is a sectional view of a first embodiment of a motor according to the invention.
Figure 2:
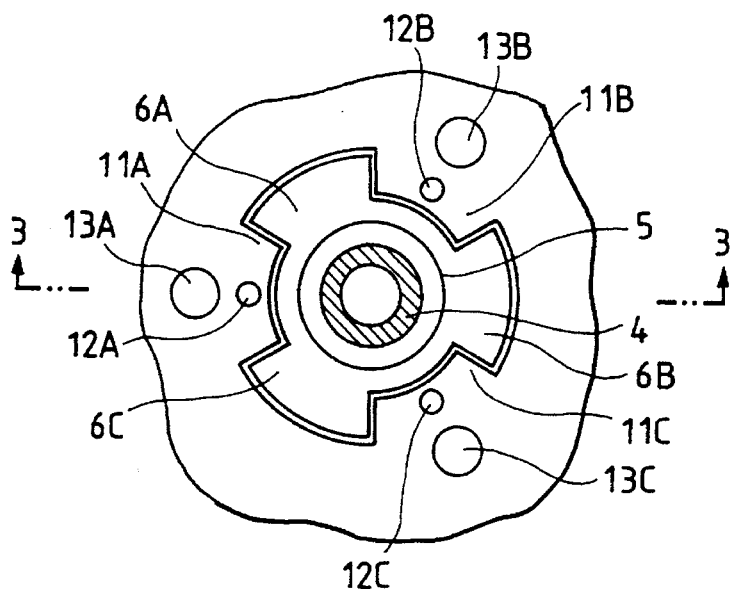
FIG. 2 is a plan view of the flange portions of a housing and a stator core used in a motor according to the first embodiment, showing a positional relation between the flange portions before they are assembled.

FIG. 1 is a sectional view of a first embodiment of a motor according to the present invention. In FIG. 1, reference character 1 designates a circuit board including a plurality of parts (not shown) which are mounted so as to make a desired circuit, and screw holes 2 are formed in the radial direction of the circuit board 1 from the center of a bearing set (to be described later) included in the circuit board 1. A bearing set 3 is composed of a bearing 4 and a housing 5 which is held by pressing the bearing 4 against the inner peripheral surface of the housing 5 to fix the bearing 4 to the housing 5. The bearing set 3 is mounted in the central portion of the circuit board 1. The housing 5 includes a flange part 6 on the outer peripheral surface thereof and the flange part 6, as shown in FIG. 2, for example, includes three flange portions 6A, 6B and 6C which are provided separately and partially along the circumferential surface of the housing 5. A rotary shaft 7 is supported by the bearing 4 such that it can be freely rotated. The dimension L (see FIG. 1) of the three flange portions 6A, 6B and 6C of the housing 5 in the radial direction thereof is set smaller than the dimension of a conventional flange portion. No screw hole is formed in the flange portions 6A, 6B and 6C and the lower surfaces thereof are not race-worked. As the material of the housing 5, similarly to the conventional housing, there is used a relatively soft material such as a zinc die casting, an aluminum die casting, a resin molding or the like.

Figure 4:
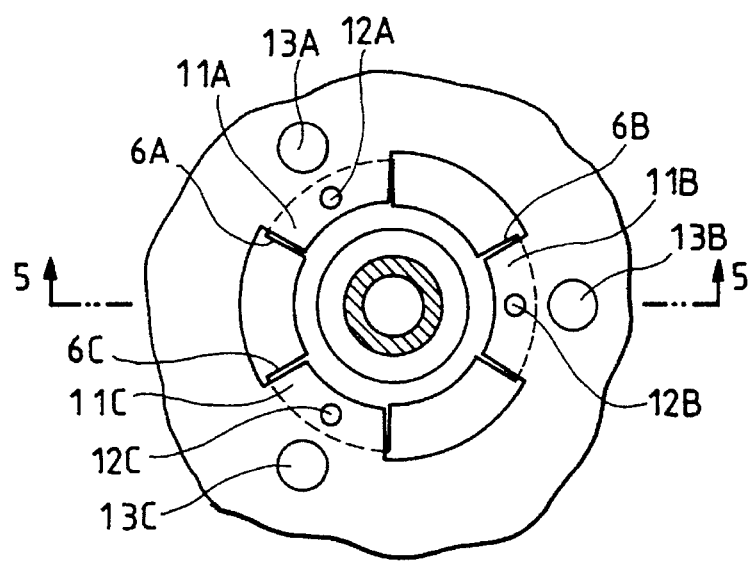
FIG. 4 is a plan view of the flange portions of a housing and a stator core used in a motor according to the first embodiment, showing a positional relation between the flange portions after they are assembled.

A core winding set 8 includes a stator core 9 formed by stacking a plurality of core materials on top of one another, a stator coil 10 wound around a plurality of salient poles formed in the outer peripheral portion of the stator core 9, and a core holder 21 to be described later. The stator core 9 includes a through-hole 20 formed in the central portion thereof, and on the inner peripheral surface thereof a flange part 11 which can be superimposed on the flange part 6 of the housing 5. As shown in FIG. 2, the flange part 11 includes, for example, three flange portions 11A, 11B and 11C which are formed separately and partially along the circumferential surface of the stator core 9. Referring to the arrangement of the three flange portions 11A, 11B and 11C with respect to the flange portions 6A, 6B and 6C of the housing 5, as shown in FIG. 2, before the housing 5 is fixed to the circuit board 1, they are disposed at positions where the flange portions 6A, 6B and 6C are not disposed; that is, they are disposed alternately. On the other hand, when the housing 5 is fixed to the circuit board 1, by rotating either of the housing 5 or the stator core 9, the flange portions of the stator core 9 can be superimposed on their associated flange portions of the housing 5 or vice versa, as shown in FIG. 4. Also, the flange portions 11A, 11B and 11C are respectively supported by the core holder 21 so that they can be held at higher positions than the flange portions 6A, 6B and 6C. The flange portions 11A, 11B and 11C of the stator core 9 include on the upper surfaces thereof projected portions 12A, 12B and 12C and screw holes 13A, 13B and 13C which are respectively formed adjacent to the projected portions.

Figure 3:
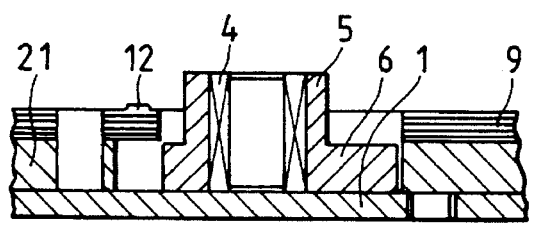
FIG. 3 is a sectional view taken along the line 3—3 shown in FIG. 2.
Figure 5:
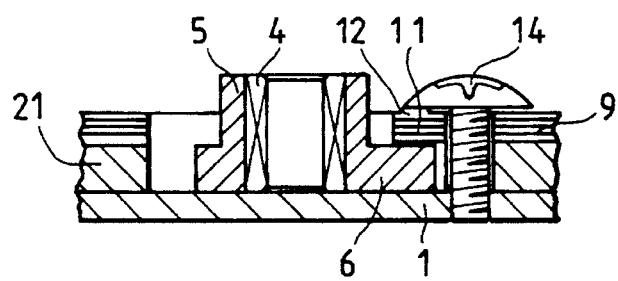
FIG. 5 is a sectional view taken along the line 5—5 shown in FIG. 4.

During assembly, the housing 5 of the bearing set 3 is inserted into the through-hole 20 in the stator core 9 and the flange portions 11A, 11B and 11C of the stator core 9 are respectively superimposed on the flange portions 6A, 6B and 6C of the housing 5 in such a manner as shown in FIG. 4. In this state, screws 14 are respectively inserted through their associated screw holes 13 (13A, 13B and 13C) in the flange portions 11A, 11B and 11C of the stator core 9 in contact with their associated projected portions (12A, 12B and 12C) and the screws 14 are thereby threadedly engaged into their associated screw holes 2 formed in the circuit board 1. This causes the screws 14 to press against the projected portions 12A, 12B and 12C to thereby flex the stator core 9. As a result of this, the flange portions 6A, 6B and 6C are respectively pressed down by the flange portions 11A, 11B and 11C and thus the housing 5 can be fixed to the circuit board 1. Reference character 15 designates a stator set obtained when the bearing set 3 is mounted to the circuit board 1 by the core winding set 8 in this manner. FIG. 3 shows a sectional view taken along the line 3—3 in FIG. 2, while FIG. 5 shows a sectional view taken along the line 5—5 in FIG. 4.

A cup-shaped rotor case 16 is disposed on the upper portion of the stator set 15. The rotor case 16 includes a drive magnet 17 fixed to the inner peripheral surface thereof such that it is opposed to the salient poles of the stator core 9, a hub base 18 which is disposed on the upper surface of the rotor case 16 and on which a disk is to be placed, and a rotary shaft 7 which is fixed to the central portion of the rotor case 16 and is to be inserted into the bearing 4. A rotor set 19 is composed of the rotor case 16 including the drive magnet 17 and hub base 18 and the rotary shaft 7. In a motor according to the present embodiment of the invention, if the stator coil 10 of the stator 9 is electrically energized, then an interaction between the energizing current and a magnetic field generated from the drive magnet 17 causes the rotor set 19 to start to rotate integrally as a united body.

Figure 6:
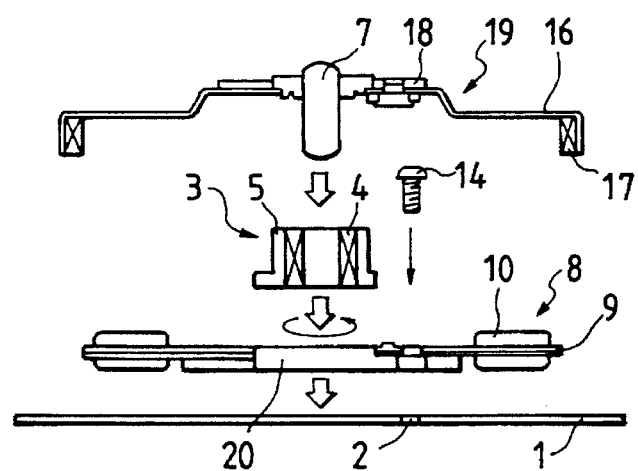
FIG. 6 is an exploded, assembling view of the motor according to the first embodiment.

Next, a description will be given below of a method of assembling the motor according to the present embodiment with reference to FIG. 6. At first, there is prepared the circuit board 1 on which a desired circuit is made, and the core winding set 8, composed of the stator core 9 with the stator coil 10 wound therearound, is assembled onto the circuit board 1. The terminal of the stator coil 10 is electrically connected with a given electric conduction path of the circuit board 1 by means of a reflow soldering method or similar processing methods. After this, the bearing set 3 consisting of the bearing 4 and housing 5 is inserted into the through-hole 20 in the stator core 9 of the core winding set 8 and, as shown in FIGS. 2 and 3, the flange portions 6A, 6B and 6C of the housing 5 and the flange portions 11A, 11B and 11C of the stator core 9 are positioned in such a manner that they are arranged alternately. Then, by rotating one of the housing 5 and stator core 9, for example, by rotating the housing 5 in such a manner as shown by an arrow, the flange portions 11A, 11B and 11C of the stator core 9 are respectively superimposed on the flange portions 6A, 6B and 6C of the housing 5, as shown in FIGS. 4 and 5. In this state, the screws 14 are respectively inserted through the screw holes 13A, 13B and 13C of the flange portions 11A, 11b and 11C of the stator core 9 in contact with the projected portions 12A, 12B and 12C into the screw holes 2 of the circuit board 1. In this insertion, the screws 14 press against the projected portions 12A, 12B and 12C to thereby flex the flange portions 11A, 11B and 11C of the stator core 9. This presses down the flange portions 6A, 6B and 6C of the housing 5, so that the housing 5 can be fixed to the circuit board 1. After this, if the rotor set 19 consisting of the rotor case 16 and the rotary shaft 7 fixed thereto is inserted into the bearing 4 of the bearing set 3, then such a motor as shown in FIG. 1 can be assembled.

As described above, according to the present embodiment, the flange portions 6A, 6B and 6C are provided partially on the outer peripheral surface of the housing 5, the flange portions 11A, 11B and 11C which can be respectively superimposed on the flange portions 6A, 6B and 6C are partially provided on the inner peripheral surface of the stator core 9, the projected portions 12A, 12B and 12C and the screw holes 13A, 13B and 13C are formed in the stator core 9 in such a manner that the projected portions and screw holes are disposed adjacent to one another, and the flange portions 11A, 11B and 11C of the stator core 9 are superimposed on the flange portions 6A, 6B and 6C of the housing 5. In this state, the screws 14 are inserted respectively through the screw holes 13A, 13B and 13C of the flange portions 11A, 11B and 11C of the stator core 9 in contact with the projected portions 12A, 12B and 12C into the screw holes 2 in the circuit board 1, whereby the flange portions 11A, 11B and 11C of the stator core 9 are flexed to press down the flange portions 6A, 6B and 6C so that the housing 5 can be fixed to the circuit board 1.

Therefore, there can be obtained the following effects:

(1) Due to the fact that, when the screws 14 are inserted through the flange portions 11A, 11B and 11C of the stator core 9 into the circuit board 1, the flange portions 11A, 11B and 11C are flexed by the screws 14 and the flange portions 6A, 6B and 6C of the housing 5 are pressed down by use of elastic forces generated from such flexed flange portions 11A, 11B and 11C, thereby fixing the housing 5 to the circuit board 1, there are eliminated influences due to the thicknesses, deformation or other conditions of the housing and stator core which can be found in the conventional structure, so that the assembling accuracy of the housing 5 with respect to the circuit board 1 can be improved.

(2) Since the need to race-work the housing 5 and to work the screw holes in the housing 5 is eliminated, the housing itself can be reduced in size, and the material of the housing 5 can be selected more widely, so that the cost of the housing 5 and thus the cost of the motor can be reduced.

(3) Because the core winding set 8 can be assembled to the circuit board 1 before the bearing set 3 is assembled, a reflow soldering method can be used, which makes it possible to reduce the cost of the motor and to stabilized the quality of the motor.

Figures 7A, 7B:
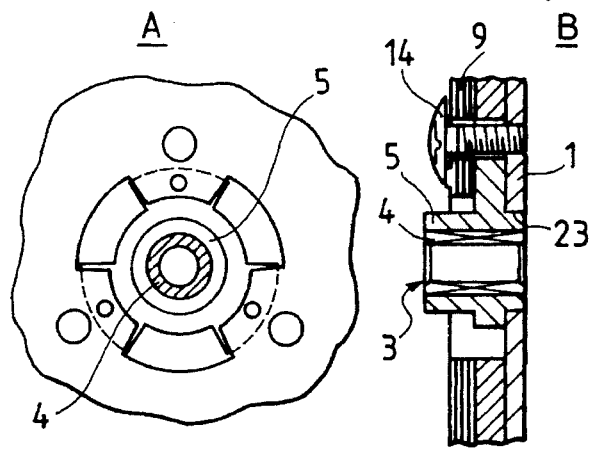
FIGS. 7A and 7B are explanatory views of a second embodiment of a motor according to the invention.

FIGS. 7A and 7B show a second embodiment of a motor according to the invention, in which a through-hole 23 is formed in a circuit board 1 and a bearing set 3 is mounted to the circuit board 1 in such a manner that it extends through the two sides of the circuit board 1. According to the second embodiment, not only similar effects to the first embodiment can be obtained, but also there can be obtained another effect in that provision of a chucking structure on the rotor case 16 side is compatible with provision of a chucking structure on the opposite side to the rotor case 16. FIG. 7A shows a plane structure and FIG. 7B shows a section structure.

Figures 8A, 8B:
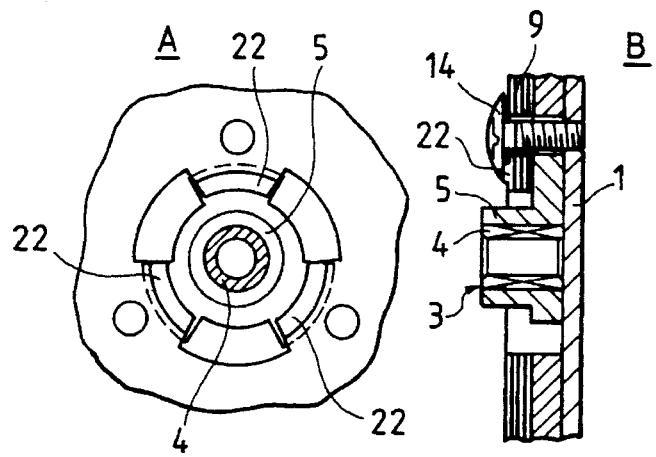
FIGS. 8A and 8B are explanatory views of a third embodiment of a motor according to the invention.

In FIGS. 8A and 8B, there is shown a third embodiment of a motor according to the invention, in which projected portions 22 to be formed in the stator core 9 are respectively shaped in an arc extending along the circumference of the stator core 9. According to the third embodiment, not only similar effects to the first embodiment can be obtained but also, since the arc shape of the projected portion 22 increases the area of the projected portion 22, when the projected portion 22 is fixed by a screw 14, the fixing strength can be increased.

Figures 9A, 9B:
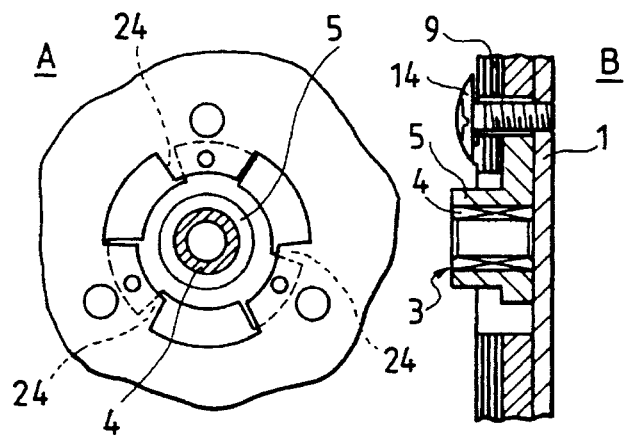
FIGS. 9A and 9B are explanatory views of a fourth embodiment of a motor according to the invention.
Figures 10A, 10B:
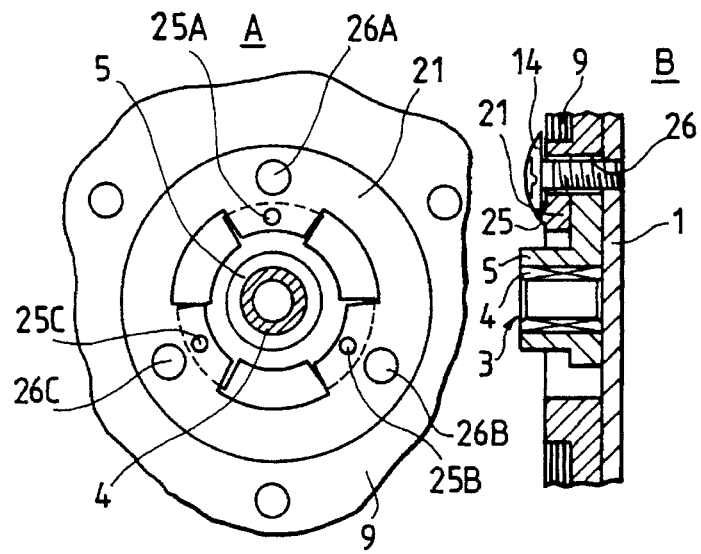
FIGS. 10A and 10B are explanatory views of a fifth embodiment of a motor according to the invention.

In FIGS. 9A and 9B, there is shown a fourth embodiment of a motor according to the invention, in which rotation preventive portions 24 are formed in the stator core 9 to thereby restrict the rotation of the housing 5. Also, in FIGS. 10A and 10B, there is shown a fifth embodiment of a motor according to the invention, in which projected portions 25 (25A, 25B, 25C) and screw holes 26 (26A, 26B, 26C) are formed adjacent to a core holder 21 and screws 14 are inserted through the screw holes 26 in contact with the projected portions 25, respectively. According to the fourth and fifth embodiments, there can be obtained similar effects to the first embodiment.

According to the respective embodiments shown in FIGS. 8A to 10B, like the embodiment shown in FIGS. 7A and 7B, there can be employed a structure in that the bearing set 3 is so arranged to extend through the two sides of the circuit board 1. Also, according to the respective embodiments shown in FIGS. 9A, 9B and 10A, 10B, like the embodiment shown in FIGS. 8A and 8B, there can be employed a structure that the arc-shaped projected portions 2 are formed in the stator core 9. Further, according to the embodiment shown in FIGS. 10A and 10B, like the embodiment shown in FIGS. 9A and 9B, there can be employed a structure that the rotation preventive portions 24 are provided.

Figure 11:
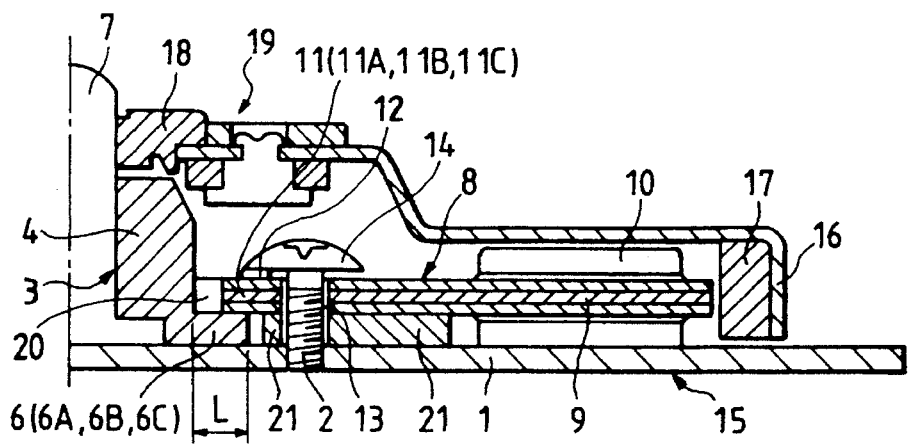
FIG. 11 is an explanatory view of a sixth embodiment of a motor according to the invention.
Figure 12:
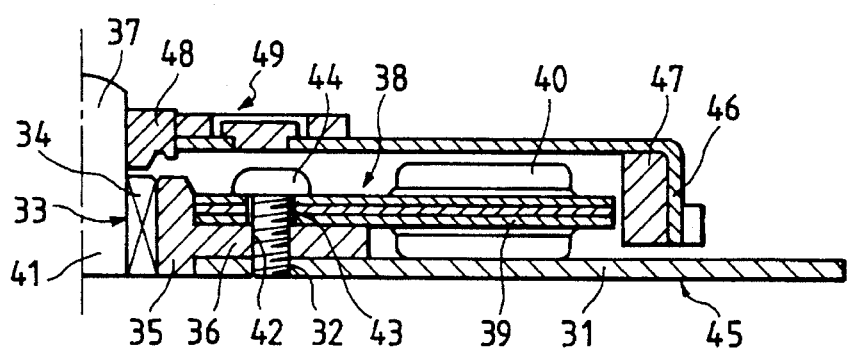
FIG. 12 is a sectional view of a conventional motor.

FIG. 11 shows a sixth embodiment of a motor according to the invention, in which no housing is used but rather a bearing 4 is formed integrally with a flange part by use of a sintered oilless bearing or the like. According to the sixth embodiment as well, there can be obtained similar effects to the first embodiment without preparing a housing separately from a bearing. The sixth embodiment can apply also to the first through fifth embodiments. Here, it should be noted that, in the above-mentioned respective embodiments, the number of the flange portions to be partially formed in the housing 5 or to be formed integrally with the bearing 4 and the number of the flange portions to be formed in the stator core 9 are just an example. According to the invention, the number and shape of the flange portions can be changed arbitrarily.

As has been described heretofore, the flange portions are partially formed on the outer peripheral surface of the housing or bearing, the flange portions that can be superimposed respectively on the flange portions of the housing or bearing are partially formed on the inner peripheral surface of the stator core, the projected portions and the screw holes are formed in the stator core in such a manner that they are positioned adjacent to each other, and the flange portions of the stator core are respectively superimposed on the flange portions of the housing or bearing. In this state, the screws are respectively inserted through the screw holes formed in the flange portions of the stator core into the screw holes formed in the circuit board, whereby the flange portions of the stator core are flexed to press down the flange portions of the housing or bearing, so that the bearing set can be fixed to the circuit board. For this reason, the assembling accuracy of the bearing set with respect to the circuit board can be improved, the cost of the motor can be reduced, and the quality of the motor can be stabilized.

It is contemplated that numerous modifications may be made to the motor of the present invention without departing from the spirit and scope of the invention as defined in the following claims.

What is claimed is:

1. A motor comprising:

a circuit board;

a stator core having a plurality of salient poles with a stator coil wound therearound;

a rotor case having a drive magnet disposed opposed to the stator core;

a bearing for supporting a rotary shaft fixed to a central portion of the rotor case; and a housing fixed to the circuit board and for holding the bearing, wherein a plurality of flange portions are respectively formed partially on an outer peripheral surface of said housing, a plurality of further flange portions, respectively superimposable on top of said flange portions of said housing, are formed partially on an inner peripheral surface of said stator core, a plurality of projected portions and screw holes are further formed in said stator core such that said projected portions and screw holes are disposed adjacent to each other and said projected portions protrude from a top surface of said stator core, whereby when said further flange portions of said stator core are superimposed on top of said flange portions of said housing, by threadedly inserting screws through said screw holes in contact with said projected portions into said circuit board, said further flange portions of said stator core are flexed to press down said flange portions of said housing, so that said housing is fixed to said circuit board.

2. A motor as claimed in claim 1, wherein the circuit board includes a through hole in which a portion of said housing is disposed.

3. A motor as claimed in claim 1, wherein a rotation preventive portion for restricting rotation of said housing is provided on said stator core.

4. A motor comprising:

a circuit board;

a stator core having a plurality of salient poles with a stator coil wound therearound;

a rotor case having a drive magnet disposed opposed to the stator core; and a bearing for supporting a rotary shaft fixed to a central portion of the rotor case, wherein a plurality of flange portions are respectively formed partially on an outer peripheral surface of said bearing, a plurality of further flange portions, respectively superimposable on top of said flange portions of said bearing, are formed partially on a inner peripheral surface of said stator core, a plurality of projected portions and screw holes are further formed in said stator core such that said projected portions and screw holes are disposed adjacent to each other and said projected portions protrude from a top surface of said stator core, whereby when said further flange portions of said stator core are superimposed on top of said flange portions of said bearing, by threadedly inserting screws through said screw holes in contact with said projected portions into said circuit board, said further flange portions of said stator core are flexed to press down said flange portions of said bearing, so that said bearing is fixed to said circuit board.

5. A motor as claimed in claim 4, wherein said projected portions extend along a circumference of the top surface of said stator core.

6. A motor as claimed in claim 4, wherein a rotation preventive portion for restricting rotation of said bearing is provided on said stator core.

* * * * *